(12) United States Patent
Morinaga et al.

(10) Patent No.: US 6,830,043 B2
(45) Date of Patent: Dec. 14, 2004

(54) SECONDARY AIR SUPPLY ABNORMALITY DETECTION SYSTEM

(75) Inventors: Shujirou Morinaga, Takahama (JP); Kenichi Sago, Nishikamo-gun (JP); Satoshi Kodou, Kariya (JP); Kenichi Fujiki, Toyoake (JP); Masayuki Kita, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/744,073

(22) Filed: Dec. 24, 2003

(65) Prior Publication Data

US 2004/0148926 A1 Aug. 5, 2004

(30) Foreign Application Priority Data

Dec. 24, 2002 (JP) ........................................ 2002-372140
Mar. 20, 2003 (JP) ........................................ 2003-078725

(51) Int. Cl.⁷ .............................................. F02B 75/08
(52) U.S. Cl. ....................................................... 123/698
(58) Field of Search ................................. 123/698, 699, 123/700, 672, 704, 434

(56) References Cited

U.S. PATENT DOCUMENTS

| 5,315,823 A | 5/1994 | Nishikawa et al. |
| 5,381,658 A | 1/1995 | Meguro |
| 6,408,617 B1 * | 6/2002 | Takaku et al. ................ 60/277 |

FOREIGN PATENT DOCUMENTS

JP          63-212750          5/1998

\* cited by examiner

*Primary Examiner*—Bibhu Mohanty
(74) *Attorney, Agent, or Firm*—Nixon & Vanderhye P.C.

(57) ABSTRACT

A secondary air supply abnormality detection system determines that an abnormality is generated in a system including a secondary air supply system if a true secondary air flow rate is out of a predetermined range. The true secondary air flow rate is calculated by subtracting a secondary air flow rate average at the time when an air pump is not operating from another secondary air flow rate average at the time when the air pump is operating. Thus, variation in the secondary air flow rate due to change with time or production tolerance can be suitably corrected. Since calculation accuracy of the true secondary air flow rate is improved, determination accuracy of the abnormality in the system including the secondary air supply system can be improved.

16 Claims, 6 Drawing Sheets

SECONDARY AIR SUPPLY ABNORMALITY DETECTION SYSTEM

CROSS REFERENCE TO RELATED APPLICATION

This application is based on and incorporates herein by reference Japanese Patent Applications No. 2002-372140 filed on Dec. 24, 2002 and No. 2003-78725 filed on Mar. 20, 2003.

BACKGROUND OF THE INVENTION

1. Field of the Invention

The present invention relates to a secondary air supply abnormality detection system of an internal combustion engine for detecting an abnormality in secondary air supply, which is performed in order to activate a catalyst disposed in an exhaust passage of the internal combustion engine.

2. Description of Related Art

Conventionally, a method of sensing a flow rate of secondary air directly by using a pressure sensor or a flow rate sensor in order to detect an abnormality in secondary air supply in an internal combustion engine is known. However, in this method, an increase in the cost is unavoidable because of the additional sensors and the like.

A technology relating to the above method is disclosed in Japanese Patent Unexamined Publication No. H06-146867 (pages 2 and 3). In this technology, an oxygen sensor for sensing oxygen concentration in exhaust gas is disposed downstream from an opening of a secondary air supply passage. More specifically, the oxygen sensor is disposed in a secondary air downstream flow, or a flow of the exhaust gas supplied with the secondary air. When an output of the oxygen sensor is reversed, it can be determined that an air-fuel ratio of the secondary air downstream flow is a theoretical air-fuel ratio. Therefore, a method for determining a flow rate of the secondary air (secondary air supply quantity), which is supplied from a secondary air supply system to the exhaust passage, based on an air intake quantity and an operating state of the engine at the time when the output of the oxygen sensor is reversed is proposed.

However, in the above technology, the secondary air flow rate can be calculated only in the case where the air-fuel ratio of the secondary air downstream flow is controlled near the theoretical air-fuel ratio and the output of the oxygen sensor changes rapidly. In addition, there is a possibility that a large calculation error is generated because the secondary air flow rate is calculated in one time.

Other technologies relating to the secondary air supply abnormality detection system for the internal combustion engine are disclosed in Japanese Patent Unexamined Publication No. H05-171973 and Japanese Patent Gazette No. 2576487, for instance.

Japanese Patent Application Unexamined Publication No. H05-171973 (page 2) discloses a technology for heating the catalyst quickly without using a high-capacity air pump. The catalyst can be heated and activated quickly by making the air-fuel ratio of air-fuel mixture supplied to the engine richer and by supplying the secondary air.

A technology disclosed in Japanese Patent Gazette No. 2576487 (pages 1 and 2) prohibits operation for increasing a fuel supply quantity if an abnormality in the secondary air supply system is detected while the fuel supply quantity increasing operation is performed in a heavy load operation. Thus, thermal degradation of the catalyst caused when the catalyst is heated excessively can be prevented. When the abnormality in the secondary air supply system is eliminated, the catalyst can exert normal cleaning effect immediately. Thus, the degradation in the emission can be prevented. The operation range of the internal combustion engine that requires the fuel supply quantity increasing correction is not limited to the heavy load operation range. Other than that, the fuel supply quantity increasing correction is required during warm-up operation after the start or during a transitional period where acceleration and deceleration are repeated, for instance. Moreover, the fuel supply quantity increasing correction corresponding to feedback correction for providing a lean air-fuel ratio is required. If the secondary air supply system is brought to an abnormal state and keeps supplying the secondary air, the temperature of the catalyst increases rapidly and the catalyst main body will be heated excessively. As a result, the temperature of the catalyst will exceed limit temperature (a criterion), above which the thermal degradation of the catalyst is caused.

SUMMARY OF THE INVENTION

It is therefore an object of the present invention to provide a secondary air supply abnormality detection system for an internal combustion engine capable of accurately calculating a flow rate of secondary air independently of an air-fuel ratio of a flow downstream of the secondary air, without requiring additional sensors. Thus, the secondary air supply abnormality detection system capable of accurately detecting an abnormality in a system including a secondary air supply system can be provided.

It is another object of the present invention to provide a secondary air supply abnormality detection system for an internal combustion engine enabling a vehicle to travel to a safe place when an abnormality in a flow rate of secondary air supplied from a secondary air supply system is detected, while preventing thermal degradation of a catalyst.

According to an aspect of the present invention, a secondary air supply abnormality detection system for an internal combustion engine includes air-fuel ratio estimating means, air-fuel ratio sensing means, secondary air flow rate calculating means and abnormality determining means. The air-fuel ratio estimating means estimates an air-fuel ratio of air-fuel mixture supplied to the engine. The air-fuel ratio sensing means senses an air-fuel ratio. The secondary air flow rate calculating means calculates a flow rate of the secondary air supplied from the secondary air supply system based on the air-fuel ratio of the air-fuel mixture supplied to the engine, which is estimated by the air-fuel ratio estimating means, and the air-fuel ratio, which is sensed by the air-fuel ratio sensing means when the secondary air is supplied from the secondary air supply system. The abnormality determining means determines an abnormality in a system including the secondary air supply system based on the calculated secondary air flow rate. Thus, the secondary air flow rate can be calculated highly accurately independently of the air-fuel ratio of a flow downstream of the secondary air. As a result, the abnormality in the system including the secondary air supply system can be detected accurately.

According to another aspect of the present invention, the secondary air supply abnormality detection system for the internal combustion engine includes abnormality determining means. The abnormality determining means determines that an abnormality is generated in the system including the secondary air supply system if an air-fuel ratio deviation between the air-fuel ratio of the air-fuel mixture supplied to the engine and the air-fuel ratio, which is sensed by the air-fuel ratio sensing means when the secondary air is supplied from the secondary air supply system, is not in a predetermined range. Thus, the air-fuel ratio deviation can be calculated highly accurately independently of the air-fuel ratio of the flow downstream of the secondary air, and the abnormality in the system including the secondary air supply system can be detected highly accurately.

According to yet another aspect of the present invention, abnormality determining means determines the abnormality in the flow rate of the secondary air supplied from the secondary air supply system. If it is determined that the secondary air supply system is in the abnormal state, air intake quantity supplied to the internal combustion engine is restricted. Thus, temperature increase of a catalyst beyond limit temperature, above which thermal degradation of the catalyst is caused, can be prevented when the secondary air supply system is in the abnormal state. The excessive temperature increase of the catalyst is cause when intake air quantity is excessive.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT

First Embodiment

Figure 1:
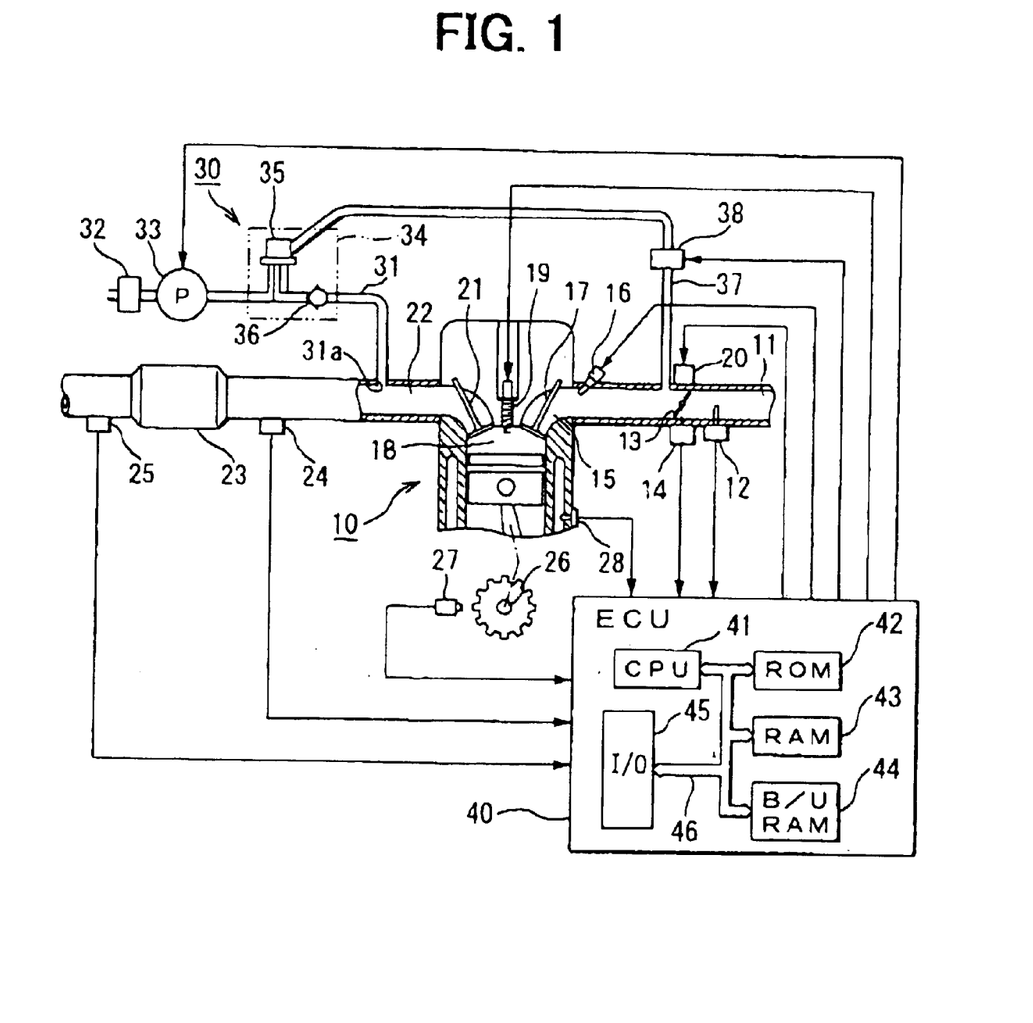
FIG. 1 is an internal combustion engine having a secondary air supply abnormality detection system according to a first embodiment of the present invention.

Referring to FIG. 1, an internal combustion engine 10 having a secondary air supply abnormality detection system according to the first embodiment of the present invention is illustrated. As shown in FIG. 1, an airflow meter 12 for sensing a quantity of intake air supplied through an air cleaner is disposed on an upstream side of an air intake passage 11 of the engine 10. A throttle valve 13 for regulating the air intake quantity to the engine 10 is disposed downstream of the airflow meter 12. A direct current motor 20 as an actuator constituting an electronic throttle structure drives the throttle valve 13 to open or close. A throttle opening degree sensor 14 for sensing an opening degree of the throttle valve 13 is disposed on the throttle valve 13. In the air intake passage 11, an injector (a fuel injection valve) 16 is disposed near an intake port 15 of each cylinder of the engine 10.

Mixture of intake air of a quantity defined by the throttle valve 13 and fuel supplied by the injector 16 through injection is introduced into a combustion chamber 18 of the engine 10 when an intake valve 17 opens. An ignition plug 19 is disposed on a side of a cylinder head of each cylinder of the engine 10. The air-fuel mixture in the combustion chamber 18 is ignited by spark discharge performed with the ignition plug 19. The air-fuel mixture is combusted in the combustion chamber 18 and is discharged from the combustion chamber 18 to an exhaust passage 22 as exhaust gas when an exhaust valve 21 opens.

A known three-way catalyst 23 is disposed in the exhaust passage 22. An air-fuel ratio sensor 24 for outputting a linear signal corresponding to an air-fuel ratio of the exhaust gas is disposed upstream of the three-way catalyst 23. An oxygen sensor 25 is disposed downstream of the three-way catalyst 23. Output voltage of the oxygen sensor 25 is reversed depending on whether the air-fuel ratio of the exhaust gas is richer or leaner than a theoretical air-fuel ratio. A crank angle sensor 27 is disposed on a crankshaft 26 of the engine 10 for sensing a crank angle (°CA) as a rotational angle of the crankshaft 26. Engine rotation speed NE is calculated based on the rotational angle of the crankshaft 26 per unit time. Moreover, a water temperature sensor 28 for sensing temperature of cooling water is disposed in the engine 10.

Next, structure of a secondary air supply system 30 for supplying ambient air into the exhaust passage 22 will be explained. A secondary air supply passage 31 for supplying the secondary air is connected to the exhaust passage 22 upstream of the air-fuel ratio sensor 24. An air filter 32 is disposed on an atmosphere side of the secondary air supply passage 31. An air pump 33 for pressure-feeding the secondary air is disposed downstream of the air filter 32.

A combination valve 34 is disposed on the exhaust passage 22 side of the air pump 33. The combination valve 34 is formed by integrating a pressure-driven type open-close valve 35 and a check valve 36 disposed downstream of the open-close valve 35. The open-close valve 35 opens or closes the secondary air supply passage 31. The open-close valve 35 of the combination valve 34 is changed between an opening state and a closing state by back pressure introduced through an intake pressure introduction passage 37. The intake pressure introduction passage 37 is connected with the air intake passage 11. The back pressure of the open-close valve 35 is switched between the atmospheric pressure and the intake pressure by an electromagnetic switching valve 38 disposed in the intake pressure introduction passage 37.

More specifically, when the secondary air is to be supplied, the switching valve 38 is opened to introduce the intake pressure in the air intake passage 11. The open-close valve 35 is opened by introducing the intake pressure into the open-close valve 35. Thus, the secondary air discharged from the air pump 33 flows into the check valve 36 side through the open-close valve 35. The check valve 36 restricts the inflow of the exhaust gas from the exhaust passage 22. When the pressure of the secondary air provided by the air pump 33 becomes higher than the exhaust gas pressure, the check valve 36 is opened by the pressure of the secondary air and the secondary air is supplied into the exhaust passage 22.

On the other hand, when the secondary air supply is to be stopped, the air pump 0.33 is stopped and the atmospheric pressure is introduced to the open-close valve 35 by switching the switching valve 38 to a position for introducing the atmospheric pressure. Thus, the open-close valve 35 is closed and the supply of the secondary air to the exhaust passage 22 is stopped. Meanwhile, the pressure on the exhaust passage 22 side increases because the pressure of the secondary air applied on the check valve 36 is eliminated. Therefore, the check valve 36 is closed automatically and the reverse flow of the exhaust gas from the exhaust passage 22 to the air pump 33 side can be prevented.

An electronic control unit (an ECU) 40 is an arithmetic logic unit including a CPU 41, ROM 42, RAM 43, backup RAM 44, an input-output circuit 45, a bus line 46 and the like. The CPU 41 performs various types of calculation processing. The ROM 42 stores control programs, control maps and the like. The RAM 43 stores various data and the like. The bus line 46 connects these components with each other. Signals from the above various sensors are inputted to the ECU 40. The ECU 40 outputs control signals to the injector 16, the ignition plug 19, the air pump 33 of the secondary air supply system 30, the switching valve 38 and the like based on the inputted signals.

Next, processing steps of the secondary air supply abnormality detection performed by the CPU 41 of the ECU 40 used in the secondary air supply abnormality detection system of the engine 10 according to the first embodiment will be explained based on a flowchart shown in FIG. 2. An operation of the secondary air supply abnormality detection system will be explained based on FIG. 3. More specifically, FIG. 3 shows behaviors of the parameters calculated in the flowchart shown in FIG. 2. The parameters shown in FIG. 3 are an engine supply air-fuel ratio $\lambda$ENG of the air-fuel mixture supplied to the engine 10, a secondary air downstream air-fuel ratio $\lambda$AFS of the exhaust gas sensed downstream of the secondary air supply passage 31 and a secondary air flow rate QAI (g/sec) calculated based on these two parameters. The CPU 41 repeats the secondary air supply abnormality detection routine shown in FIG. 2 at a predetermined time interval.

Figure 2:
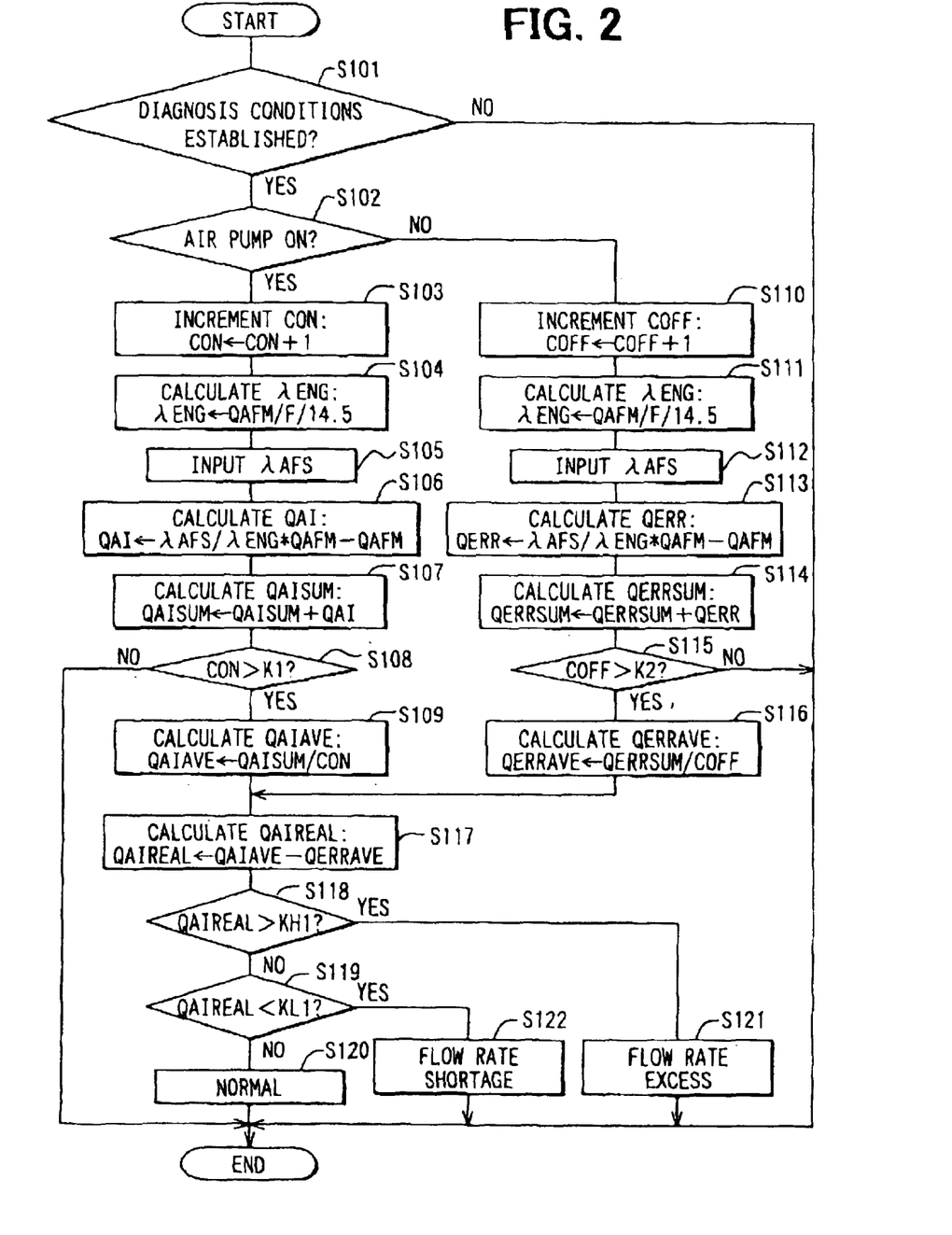
FIG. 2 is a flowchart showing processing steps of secondary air supply abnormality detection performed by an electronic control unit of the secondary air supply abnormality detection system according to the first embodiment.
Figure 3:
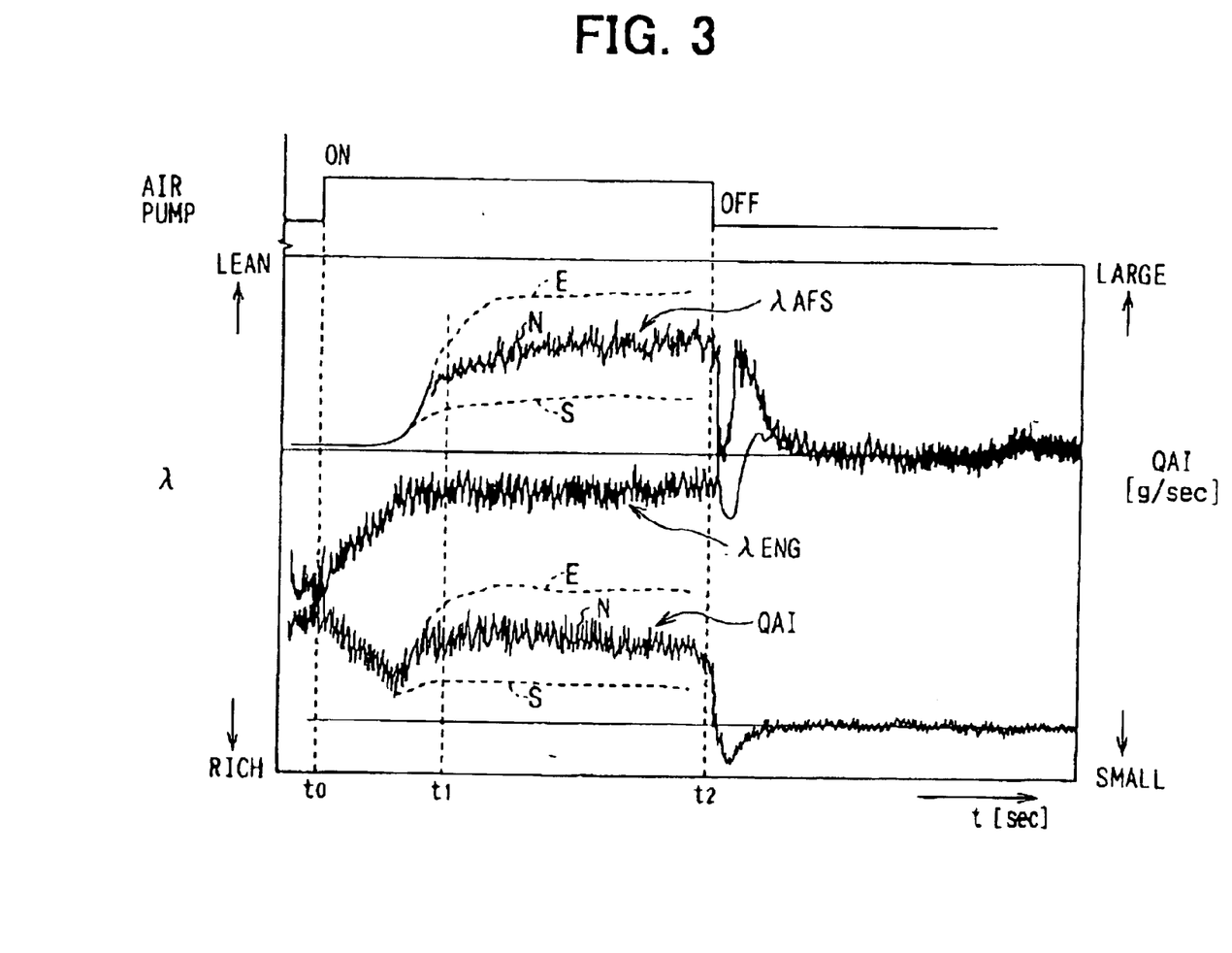
FIG. 3 is a time chart showing transitional states of an engine supply air-fuel ratio, a secondary air downstream air-fuel ratio and a secondary air flow rate corresponding to the secondary air supply abnormality detection according to the first embodiment.

First, in Step S101 in FIG. 2, it is determined whether conditions for diagnosis are established or not. The conditions for the diagnosis includes a condition that the air-fuel ratio sensor 24 is active, a condition that the operating state is steady (without rapid change), a condition that a predetermined period passes after the air pump 33 is turned on or turned off as shown by a period from time t0 to time t1 in FIG. 3, and a condition that the air intake quantity QAFM is less than a predetermined quantity $\alpha$, for instance. The activity of the air-fuel ratio sensor 24 can be determined based on whether element impedance is lower than a predetermined value (k$\Omega$), for instance.

If the result of the determination in Step S101 is "YES", or if all the diagnosis conditions are established in Step S101 (after time t1 in FIG. 3), the processing proceeds to Step S102 and it is determined whether the air pump 3 is operating or not. If the result of the determination in Step S102 is "YES", or it is determined that the air pump 3 is operating and the secondary air is supplied, the processing proceeds to Step S103 and a continuation counter CON representing the supply (ON) of the secondary air is incremented by one. Then, the processing proceeds to Step S104 and the engine supply air-fuel ratio $\lambda$ENG of the air-fuel mixture supplied to the engine 10 is calculated from the air intake quantity QFAM sensed by the airflow meter 12 and the injection quantity F of the fuel injected by the injector 16 based on a following formula (1). The number "14.7" in the formula (1) is a value near the theoretical air-fuel ratio.

$$\lambda\text{ENG} \leftarrow \text{QFAM}/\text{F}/14.7, \tag{1}$$

Then, the processing proceeds to Step S105 and the secondary air downstream air-fuel ratio $\lambda$AFS of the flow downstream of the secondary air supply passage 31 is inputted through the air-fuel ratio sensor 24. Then, the processing proceeds to Step S106 and the secondary air flow rate QAI at the time when the air pump 33 is operating is calculated based on a following formula (2).

$$\text{QAI} \leftarrow \lambda\text{AFS}/\lambda\text{ENG} \times \text{QAFM} - \text{QAFM}, \tag{2}$$

Then, the processing proceeds to Step S107 and a secondary air flow rate integration value QAISUM is calculated by integrating the secondary air flow rate QAI at the time when the air pump 33 is operating, which is calculated in Step S106. Then, the processing proceeds to Step S108 and it is determined whether the continuation counter CON incremented in Step S103 is greater than a predetermined value K1 or not. If the result of the determination in Step S108 is "YES", the processing proceeds to Step S109 and a secondary air flow rate average QAIAVE of the secondary air flow rate QAI at the time when the air pump 33 is operating is calculated based on a following formula (3).

$$\text{QAIAVE} \leftarrow \text{QAISUM}/\text{CON}, \tag{3}$$

On the other hand, if the result of the determination in step S102 is "NO", the processing proceeds to Step S110 and another continuation counter COFF representing a dormant state (OFF) of the secondary air is incremented by one. Then, the processing proceeds to Step S111 and the engine supply air-fuel ratio $\lambda$ENG is calculated from the air intake quantity QAFM and the fuel injection quantity F based on the formula (1). Then, the processing proceeds to Step S112 and the secondary air downstream air-fuel ratio $\lambda$AFS on the side downstream of the secondary air supply opening 31a of the secondary air supply passage 31 is inputted by the air-fuel ratio sensor 24. Then, the processing proceeds to Step S113 and the secondary air flow rate QERR at the time when the air pump 33 is not operating is calculated based on a following formula (4).

$$\text{QERR} \leftarrow \lambda\text{AFS}/\lambda\text{ENG} \times \text{QAFM} - \text{QAFM}, \tag{4}$$

Then, the processing proceeds to Step S114 and a secondary air flow rate integration value QERRSUM is calculated by integrating the secondary air flow rate QERR at the time when the air pump 33 is not operating, which is calculated in Step S113. Then, the processing proceeds to Step S115 and it is determined whether the continuation counter COFF incremented in Step S110 is greater than a predetermined value K2 or not. If the result of the determination in Step S115 is "YES", the processing proceeds to Step S116 and a secondary air flow rate average QERRAVE of the secondary air flow rate QERR at the time when the air pump 33 is not operating is calculated based on a following formula (5).

$$QERRAVE \leftarrow QERRSUM/COFF, \quad (5)$$

The processing proceeds to Step S117 from Step S109 or Step S116. In Step S117, a true secondary air flow rate QAIREAL is calculated by subtracting the secondary air flow rate average QERRAVE at the time when the air pump 33 is not operating, which is calculated in Step S116, from the secondary air flow rate average QAIAVE at the time when the air pump 33 is operating, which is calculated in Step S109. Then, the processing proceeds to Step S118 and it is determined whether the true secondary airflow rate QAIREAL is greater than a predetermined upper limit flow rate KH1. If the result of the determination in Step S118 is "NO", the processing proceeds to Step S119 and it is determined whether the true secondary air flow rate QAIREAL is less than a predetermined lower limit flow rate KL1. If the result of the determination in Step S119 is "NO", or if the true secondary air flow rate QAIREAL is between the upper limit flow rate KH1 and the lower limit flow rate KL1, the processing proceeds to Step S120 and the secondary air supply system 30 is determined to be normal. Then, the routine is ended. In FIG. 3, ranges "N" represent the ranges of the engine supply air-fuel ratio λENG and the secondary air downstream air-fuel ratio λAFS in the case where the secondary air system is determined to be in the normal state.

On the other hand, if the result of the determination in Step S118 is "YES", the processing proceeds to Step S121 and it is determined that the secondary air supply system is in an abnormal state where the secondary air flow rate is excessive. In FIG. 3, ranges "E" represent the ranges of the engine supply air-fuel ratio λENG and the secondary air downstream air-fuel ratio λAFS in the case where the secondary air system is determined to be in the abnormal state where the secondary air flow rate is excessive. Then, the routine is ended. If the result of the determination in Step S119 is "YES", the processing proceeds to Step S122 and it is determined that the secondary air supply system 30 is in an abnormal state where the secondary air flow rate is short. In FIG. 3, ranges "S" represent the ranges of the engine supply air-fuel ratio λENG and the secondary air downstream air-fuel ratio λAFS in the case where the secondary air system is determined to be in the abnormal state where the secondary air flow rate is short. Then, the routine is ended.

If the result of the determination in Step S101 is "NO" (or if at least one of the diagnosis conditions is not established as shown by a period before the time t1 in FIG. 3), or if the result of the determination in Step S108 or Step S115 is "NO", the routine is ended without performing anything.

As explained above, the secondary air supply abnormality detection system of the internal combustion engine 10 of the present embodiment has the three-way catalyst 23, the secondary air supply system 30 and the air-fuel ratio sensor 24. The three-way catalyst 23 is disposed in the exhaust passage 22 of the engine 10 for cleaning the exhaust gas. The secondary air supply system 30 supplies the secondary air into the exhaust passage 22 upstream of the three-way catalyst 23. The air-fuel ratio sensor 24 is disposed in the exhaust passage 22 upstream of the three-way catalyst 23 and downstream of the secondary air supply opening 31a of the secondary air supply passage 31 for sensing the air-fuel ratio of the exhaust gas. The CPU 41 of the ECU 40 provides the air-fuel ratio estimating means, the secondary air flow rate calculating means and the abnormality determining means. The air-fuel ratio estimating means estimates the engine supply air-fuel ratio λENG of the air-fuel mixture supplied to the engine 10. The secondary air flow rate calculating means calculates the secondary air flow rate QAI of the secondary air supplied by the secondary air supply system 30 based on the engine supply air-fuel ratio λENG estimated by the air-fuel estimating means and the secondary air downstream air-fuel ratio λAFS, which is sensed by the air-fuel ratio sensor 24 when the secondary air is supplied by the secondary air supply system 30. The abnormality determining means determines the abnormality in the system including the secondary air supply system 30 based on the secondary air flow rate QAI calculated by the secondary air flow rate calculating means.

The abnormality determining means calculates the secondary air flow rate average QAIAVE by integrating the secondary air flow rate QAI for a predetermined period and by averaging the secondary air flow rate QAI. The abnormality determining means calculates the secondary air flow rate QERR based on the engine supply air-fuel ratio λENG and the secondary air downstream air-fuel ratio λAFS, which is sensed by the air-fuel ratio sensor 24 when the secondary air is not supplied by the secondary air supply system 30. Thus, the abnormality determining means corrects the secondary air flow rate QAI calculated by the secondary air flow rate calculating means.

Moreover, the secondary air supply abnormality detection system of the engine 10 of the present embodiment has the airflow meter 12 as air intake quantity sensing means for sensing the air intake quantity QAFM of the air supplied into the air intake passage 11 of the engine 10. The CPU 41 of the ECU 40 of the secondary air supply abnormality detection system provides fuel injection quantity calculating means for calculating the fuel injection quantity F of the fuel supplied into the engine 10 based on the various operation parameters such as the air intake quantity QAFM and the engine rotation speed NE sensed by the crank angle sensor 27. The engine supply air-fuel ratio λENG is calculated from the air intake quantity QAFM and the fuel injection quantity F.

More specifically, the true secondary air flow rate QAIREAL is calculated by correcting the secondary air flow rate average QAIAVE at the time when the air pump 33 is operating. The correction of the secondary air flow rate average QAIAVE is performed by subtracting the secondary air flow rate average QERRAVE at the time when the air pump 33 is not operating from the secondary air flow rate average QAIAVE at the time when the air pump 33 is operating. If the true secondary air flow rate QAIREAL is not in the range between the upper limit flow rate KH1 and the lower limit flow rate KL1 as the predetermined range, it is determined that the abnormality is generated in the system including the secondary air supply system 30. Thus, the variation in the secondary air flow rate due to change with time or production tolerance can be suitably corrected with a conventional system, without employing additional sensors and the like. Thus, the increase in the cost can be inhibited. The variation in the injection quantity from the injector 16 and the like can be corrected suitably and the calculation accuracy of the true secondary air flow rate QAIREAL can be improved. Thus, the determination accuracy of the abnormality in the system including the secondary air supply system 30 can be improved.

Moreover, the secondary air supply abnormality detection system stops the secondary air supply and feedback-control of the air-fuel ratio if the abnormality determining means determines that the abnormality is generated in the system including the secondary air supply system 30. In addition, the secondary air supply abnormality detection system of the present embodiment prohibits the diagnosis under the condition that the calculation error of the air-fuel ratio of the air-fuel mixture supplied to the engine 10 increases, the condition that the secondary air flow rate is unsteady, or the condition that the air intake quantity is large and the ratio of the secondary air flow rate is small. Thus, the excessive correction of the air-fuel ratio due to the deviation in the air-fuel ratio can be prevented.

In the present embodiment, the determination of the abnormality in the system including the secondary air supply system 30 is performed in the case where the secondary air flow rate provided when the air pump 33 is operating is out of the predetermined range. Alternatively, the abnormality determination of the present invention may be applied to determination of a system abnormality in which the air pump 33 is brought to an operating state in spite of the fact that a condition for stopping the air pump 33 is established and the secondary air is supplied from the secondary air supply opening 31$a$ into the exhaust passage 22 due to some abnormalities in the secondary air supply system 30 and the like in addition to the malfunction of the air pump 33, for instance.

Second Embodiment

Figure 4:
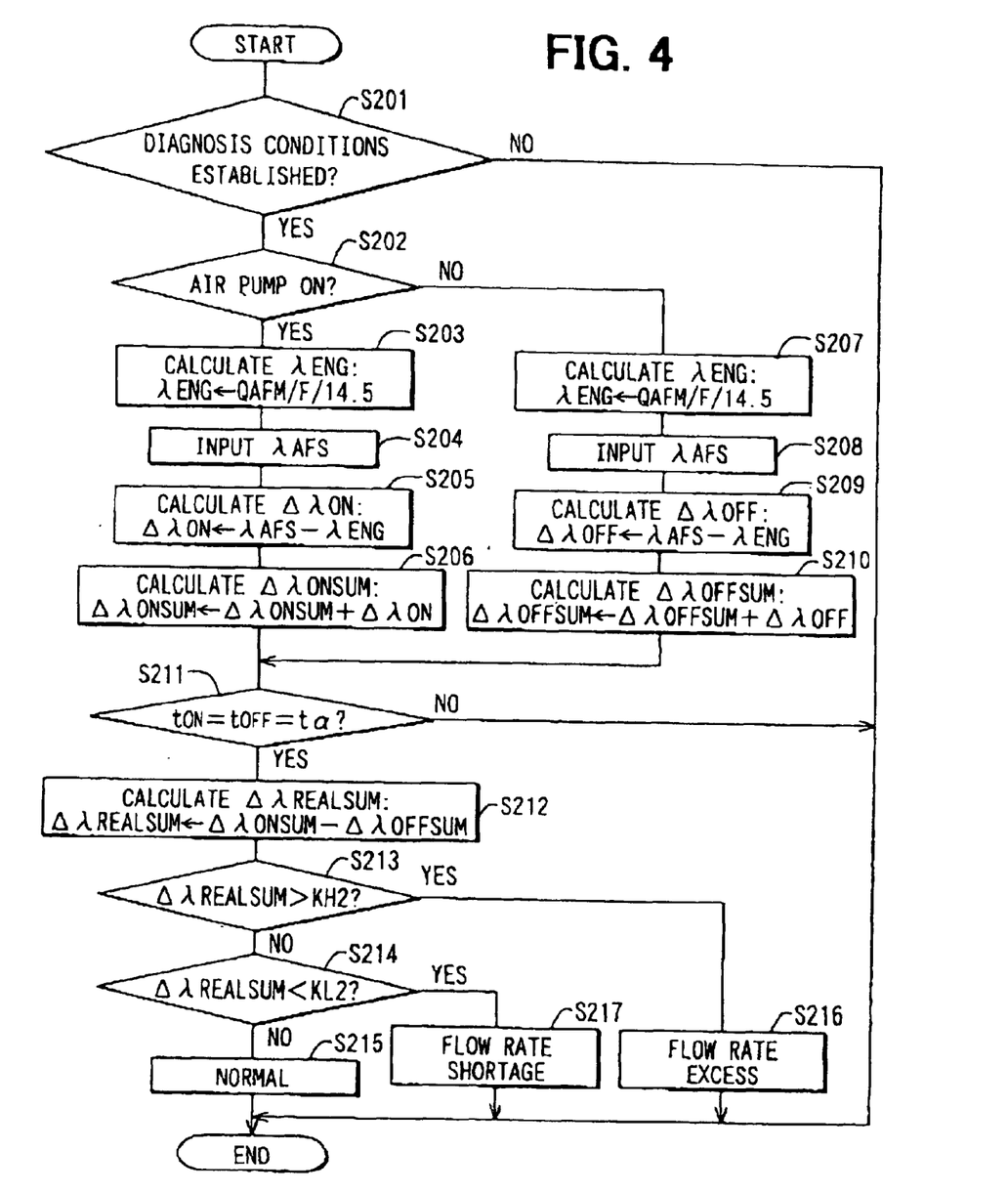
FIG. 4 is a flowchart showing processing steps of secondary air supply abnormality detection performed by an electronic control unit of a secondary air supply abnormality detection system according to a second embodiment of the present invention.

Next, processing steps of secondary air supply abnormality detection performed by the CPU 41 of the ECU 40 used in the secondary air supply abnormality detection system of the internal combustion engine 10 according to the second embodiment of the present invention will be explained based on a flowchart shown in FIG. 4 and the time chart shown in FIG. 3. The secondary air supply abnormality detection routine shown by the flowchart in FIG. 4 is performed by the CPU 41 repeatedly at a predetermined time interval. The secondary air supply abnormality detection system of the second embodiment has the same structure as the first embodiment.

First, in Step S201 of the flowchart in FIG. 4, like the first embodiment, it is determined whether conditions for the diagnosis are established or not. The conditions for the diagnosis include a condition that the air-fuel ratio sensor 24 is active, a condition that the operating state is steady (without rapid change), a condition that a predetermined period passes after the air pump 33 is turned on or turned off as shown by the period from time t0 to time t1 in FIG. 3, and a condition that the air intake quantity QAFM is less than a predetermined quantity α, for instance. If the result of the determination in Step S201 is "YES", or if all the diagnosis conditions are established, the processing proceeds to Step S202 and it is determined whether the air pump 33 is operating or not. If the result of the determination in Step S202 is "YES", or if the air pump 33 is operating and the secondary air is supplied, the processing proceeds to Step S203 and the engine supply air-fuel ratio λENG of the air-fuel mixture supplied to the engine 10 is calculated from the air intake quantity QAFN sensed by the airflow meter 12 and the injection quantity of the fuel F injected by the injector 16 based on the above formula (1).

Then, the processing proceeds to Step S204 and the secondary air downstream air-fuel ratio λAFS of the flow downstream of the secondary air supply opening 31$a$ of the secondary air supply passage 31 is inputted. Then, the processing proceeds to Step S205 and the engine supply air-fuel ratio λENG calculated in Step S203 is subtracted from the secondary air downstream air-fuel ratio λAFS inputted in Step S204. Thus, an air-fuel ratio deviation ΔλON at the time when the air pump 33 is operating is calculated. The air-fuel ratio deviation ΔλON is an air-fuel ratio deviation between the secondary air downstream air-fuel ratio λAFS and the engine supply air-fuel ratio λENG. Then, the processing proceeds to Step S206 and an air-fuel ratio deviation integration value ΔλONSUM is calculated by integrating the air-fuel ratio deviation ΔλON at the time when the air pump 33 is operating, which is calculated in Step S205.

On the other hand, if the result of the determination in Step S202 is "NO", the processing proceeds to Step S207 and the engine supply air-fuel ratio λENG is calculated from the air intake quantity QAFM and the fuel injection quantity F. Then, the processing proceeds to Step S208 and the secondary air downstream air-fuel ratio λAFS of the flow downstream of the secondary air supply opening 31$a$ of the secondary air supply passage 31 is inputted through the air-fuel ratio sensor 24. Then, the processing proceeds to Step S209 and an air-fuel ratio deviation ΔλOFF at the time when the air pump 33 is not operating is calculated by subtracting the engine supply air-fuel ratio λENG calculated in Step S207 from the secondary air downstream air-fuel ratio λAFS inputted in Step S208.

Then, the processing proceeds to Step S210 and an air-fuel ratio deviation integration value ΔλOFFSUM is calculated by integrating the air-fuel ratio deviation ΔλOFF at the time when the air pump 33 is not operating, which is calculated in Step S209. The processing proceeds to Step S211 after Step S206 or Step S210, and it is determined whether duration $t_{ON}$ of the integration of the air-fuel ratio deviation ΔλON and duration $t_{OFF}$ of the integration of the air-fuel ratio deviation ΔλOFF reach a predetermined period to respectively. If the result of the determination in Step S211 is "YES", the processing proceeds to Step S212 and an abnormality determination air-fuel ratio deviation integration value ΔλREALSUM is calculated by subtracting the air-fuel ratio deviation integration value ΔOFFSUM calculated in Step S210 from the air-fuel ratio deviation integration value ΔONSUM calculated in Step S206.

Then, the processing proceeds to Step S213 and it is determined whether the abnormality determination air-fuel ratio deviation integration value ΔλREALSUM calculated in Step S212 is greater than a predetermined upper limit value KH2. If the result of the determination in Step S213 is "NO", the processing proceeds to Step S214 and it is determined whether the abnormality determination air-fuel ratio deviation integration value ΔλREALSUM is less than a predetermined lower limit value KL2. If the result of the determination in Step S214 is "NO", or if it is determined that the abnormality air-fuel ratio deviation integration value ΔλREALSUM is between the upper limit value KH2 and the lower limit value KL2, the processing proceeds to Step S215 and it is determined that the secondary air supply system 30 is in a normal state. Then, the routine is ended.

On the other hand, if the result of the determination in Step S213 is "YES", the processing proceeds to Step S216 and it is determined that the secondary air supply system 30 is in an abnormal state where the secondary air flow rate is excessive. Then, the routine is ended. On the other hand, if the result of the determination in Step S214 is "YES", it is determined that the secondary air supply system 30 is in an abnormal state where the secondary air flow rate is short in Step S217. Then, the routine is ended. If the result of the determination in Step S201 is "NO", or if at least one of the diagnosis conditions is not established as shown by a period before the time t1 in FIG. 3, or if the result of the determination in Step S211 is "NO", the routine is ended without performing anything.

Thus, the secondary air supply abnormality detection system of the internal combustion engine 10 of the present embodiment has the three-way catalyst 23, the secondary air supply system 30 and the air-fuel ratio sensor 24. The three-way catalyst 23 is disposed in the exhaust passage 22 of the engine 10 for cleaning the exhaust gas. The secondary air supply system 30 supplies the secondary air into the exhaust passage 22 upstream of the three-way catalyst 23. The air-fuel ratio sensor 24 is disposed in the exhaust passage 22 upstream of the three-way catalyst 23 and downstream of the secondary air supply opening 31a of the secondary air supply passage 31 for sensing the air-fuel ratio of the exhaust gas. The CPU 41 of the ECU 40 provides the air-fuel ratio estimating means for estimating the engine supply air-fuel ratio λENG of the air-fuel mixture supplied to the engine 10. The CPU 41 of the ECU 40 provides the abnormality determining means for determining the abnormality in the system including the secondary air supply system 30 based on the air-fuel ratio deviation ΔλON between the engine supply air-fuel ratio λENG estimated by the air-fuel ratio estimating means and the secondary air downstream air-fuel ratio λAFS, which is sensed by the air-fuel ratio sensor 24 when the secondary air is supplied from the secondary air supply system 30.

The abnormality determining means calculates the air-fuel ratio deviation integration value ΔλONSUM by integrating the air-fuel ratio deviation ΔλON for a predetermined period. The abnormality determining means corrects the error in the calculation of the air-fuel ratio deviation ΔλON based on the air-fuel ratio deviation ΔλOFF between the engine supply air-fuel ratio λENG of the air-fuel mixture supplied to the engine 10 and the secondary air downstream air-fuel ratio λAFS, which is sensed by the air-fuel ratio sensor 24 when the secondary air is not supplied from the secondary air supply system 30.

Moreover, the secondary air supply abnormality detection system of the present embodiment includes the airflow meter 12 as air intake quantity sensing means for sensing the quantity QAFM of the intake air supplied into the intake passage 11 of the engine 10. The CPU 41 of the ECU 40 provides the fuel injection quantity calculating means for calculating the injection quantity F of the fuel supplied into the engine 10 based on the various operation parameters such as the air intake quantity QAFM and the engine rotation speed NE sensed by the crank angle sensor 27. The engine supply air-fuel ratio λENG is calculated from the air intake quantity QAFM and the fuel injection quantity F.

More specifically, the air-fuel ratio deviation integration value ΔλOFFSUM at the time when the air pump 33 is not operating is subtracted from the air-fuel ratio deviation integration value ΔλONSUM at the time when the air pump 33 is operating Thus, the air-fuel ratio deviation integration value ΔλONSUM is corrected and the abnormality determination air-fuel ratio deviation integration value ΔλREALSUM is calculated. If the abnormality determination air-fuel ratio deviation integration value ΔλREALSUM is not between the upper limit value KH2 and the lower limit value KL2 as a predetermined range, it is determined that the abnormality is generated in the system including the secondary air supply system 30. Thus, the variation in the secondary air flow rate due to the change with time or the production tolerance can be corrected suitably without employing additional sensors, and the increase in the cost can be inhibited. In addition, the variation in the fuel injection quantity F injected through the injector 16 can be corrected suitably and the calculation accuracy of the abnormality determination air-fuel ratio deviation integration value ΔλREALSUM can be improved. As a result, the determination accuracy of the abnormality in the system including the secondary air supply system 30 can be improved.

Moreover, the secondary air supply abnormality detection system stops the secondary air supply and the feedback control of the air-fuel ratio if it is determined that the abnormality is generated in the system including the secondary air supply system 30. Moreover, the secondary air supply abnormality detection system of the present embodiment prohibits the diagnosis under the condition that the calculation error of the air-fuel ratio of the air-fuel mixture supplied to the engine 10 increases, the condition that the secondary air flow rate is unsteady, or the condition that the air intake quantity is large and the ratio of the secondary air flow rate is small. Thus, the excessive correction of the air-fuel ratio due to the deviation in the air-fuel ratio can be prevented.

Third Embodiment

Next, processing steps of secondary air supply abnormality determination performed by the CPU 41 of the ECU 40 used in the secondary air supply abnormality detection system for the internal combustion engine 10 according to the third embodiment will be explained based on a flowchart shown in FIG. 5. The CPU 41 performs the secondary air supply abnormality determination routine at a predetermined time interval.

Figure 5:
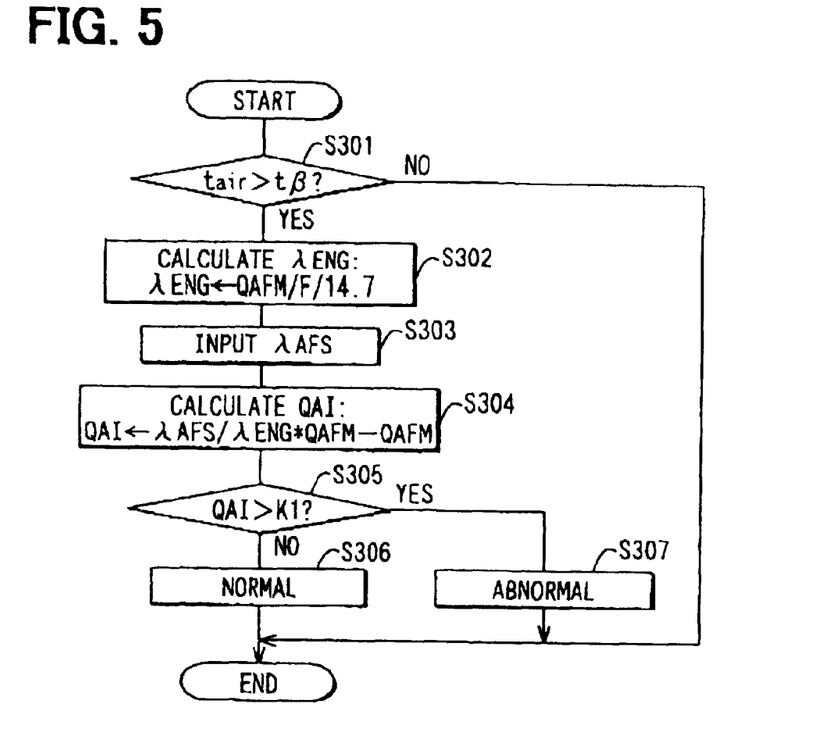
FIG. 5 is a flowchart showing processing steps of secondary air supply abnormality determination performed by an electronic control unit of a secondary air supply abnormality detection system according to a third embodiment of the present invention.

First, in Step S301 shown in FIG. 5, it is determined whether duration $t_{air}$ after the air pump 33 is switched from an operating state (ON) to a dormant state (OFF) is longer than a predetermined period tβ. The predetermined period tβ is a period for stabilizing the secondary air downstream air-fuel ratio λAFS after the supply of the secondary air is stopped. If the result of the determination in Step S301 is "NO", the routine is ended without performing anything.

On the other hand, if the result of the determination in Step S301 is "YES", the processing proceeds to Step S302 and the engine supply air-fuel ratio λENG of the air-fuel mixture supplied to the engine 10 is calculated from the air intake quantity QAFM sensed by the airflow meter 12 and the fuel injection quantify F of the fuel injected by the injector 16 based on a following formula (6). The number "14.7" in the formula (6) is a value near the theoretical air-fuel ratio.

$$\lambda ENG \leftarrow QAFM/F/14.7, \tag{6}$$

Then, the processing proceeds to Step S303 and the secondary air downstream air-fuel ratio λAFS of the flow downstream of the secondary air supply passage 31 is inputted by the air-fuel ratio sensor 24. Then, the secondary air flow rate QAI at the time when the air pump 33 is not operating (OFF) is calculated based on a following formula (7) in Step S304.

$$QAI \leftarrow \lambda AFS/\lambda ENG \times QAFM - QAFM, \tag{7}$$

Then, the processing proceeds to Step S305 and it is determined whether the secondary air flow rate QAI calculated in Step S304 is greater than a predetermined value K1. If the result of the determination in Step S305 is "NO", the processing proceeds to Step S306 and it is determined that the air pump 33 is normal because little or no secondary air is supplied in the state where the air pump 33 is not operating (OFF).

On the other hand, if the result of the determination in Step S305 is "YES", the processing proceeds to Step S307 and the secondary air supply system 30 is determined to be in an abnormal state where the secondary air flow rate QAI is greater than the predetermined value K1 in spite of the fact that the air pump 33 is ordered to stop (OFF), or where the air pump 33 keeps working because of a short circuit in an air pump driving circuit in the secondary air supply system 30 and the like. Then, the routine is ended.

Next, processing steps for setting an upper limit guard value performed by the CPU 41 of the ECU 40 of the secondary air supply abnormality detection system for the internal combustion engine 10 of the third embodiment will be explained based on a flowchart shown in FIG. 6, referring to FIG. 7. The processing for setting the upper limit guard value is performed when the abnormality in the secondary air supply is detected. FIG. 7 is a map used in the steps of the flowchart shown in FIG. 6 for setting an intake quantity upper limit guard value Qup (g/sec) in accordance with the engine rotation speed NE as a parameter. In the map shown in FIG. 7, the intake quantity upper limit guard value Qup is set to be smaller as the engine rotation speed NE increases. The routine for setting the upper limit guard value Qup is performed repeatedly by the CPU 41 at a predetermined time interval.

Figure 6:
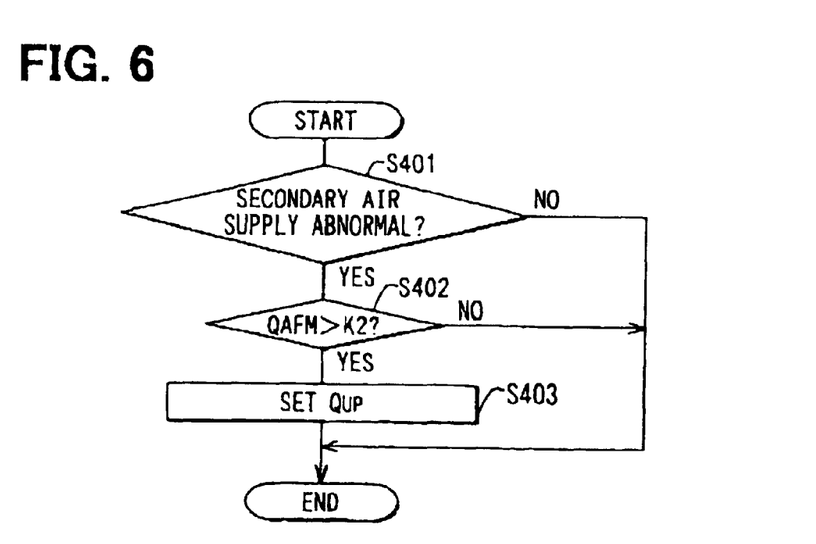
FIG. 6 is a flowchart showing processing steps for setting an upper limit guard value performed by the electronic control unit of the secondary air supply abnormality detection system according to the third embodiment.
Figure 7:
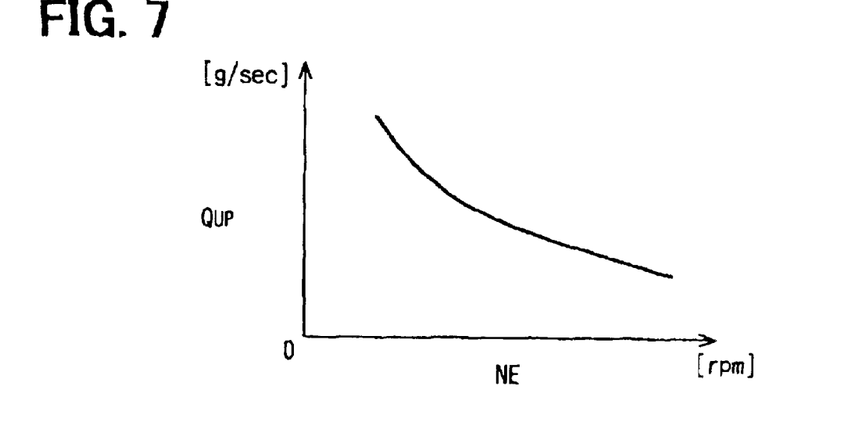
FIG. 7 is a map for setting an upper limit guard value of air intake quantity according to the third embodiment.

First, in Step S401 in FIG. 6, it is determined whether the secondary air supply, or the secondary air supply system 30, is in an abnormal state. If the result of the determination in Step S401 is "YES", the processing proceeds to Step S402 and it is determined whether the air intake quantity QAFM sensed by the airflow meter 12 at that time is greater than a predetermined air intake quantity K2. If the result of the determination in Step S402 is "YES", the processing proceeds to Step S403 and the upper limit guard value Qup of the air intake quantity AQFM is set in accordance with the engine rotation speed NE, based on the map shown in FIG. 7.

On the other hand, if the result of the determination in Step S401 or in Step S402 is "NO", the routine is ended without performing anything.

As explained above, the secondary air supply abnormality detection system for the internal combustion engine 10 of the present embodiment includes the three-way catalyst 23, the secondary air supply system 30, the abnormality determining means and the intake quantity restricting means. The three-way catalyst 23 is disposed in the exhaust passage 22 of the internal combustion engine 10 for cleaning the exhaust gas. The secondary air supply system 30 supplies the secondary air into the exhaust passage 22 upstream of the three-way catalyst 23. The abnormality determining means is provided by the CPU 41 of the ECU 40 for determining the abnormality in the flow rate QAI of the secondary air supplied from the secondary air supply system 30 when the stop of the secondary air supply is ordered. The CPU 41 of the ECU 40 provides the intake quantity restricting means for restricting the air intake quantity QAFM of the air taken into the engine 10 when the abnormality determining means determines that the secondary air supply system 30 is in the abnormal state. The abnormality determining means determines the abnormality in the flow rate of the secondary air supplied by the secondary air supply system 30 when a predetermined period passes after the stop of the secondary air supply is ordered.

More specifically, when the stop of the secondary air supply is ordered, whether the abnormality exists in the secondary air supply from the secondary air supply system 30 is determined based on the secondary air downstream air-fuel ratio $\lambda$AFS sensed by the air-fuel ratio sensor 24 and the engine supply air-fuel ratio $\lambda$ENG estimated based on the air intake quantity QAFM and the fuel injection quantity F as the operation parameters at that time. The determination is performed when the predetermined period passes after the stop of the secondary air supply is ordered and the secondary air downstream air-fuel ratio $\lambda$AFS becomes steady. More specifically, the abnormality in the secondary air supply system 30 can be determined because the secondary air downstream air-fuel ratio $\lambda$AFS should coincide with the engine supply air-fuel ratio $\lambda$ENG when the secondary air supply from the secondary air supply system 30 is in a dormant state. If the secondary air supply system 30 is determined to be in the abnormal state, the air intake quantity QAFM to the engine 10 is restricted. Therefore, when the secondary air supply system 30 is in the abnormal state, the excessive temperature increase of the three-way catalyst 23 beyond the limit temperature, above which the thermal degradation of the three-way catalyst 23 will be caused, due to the excessive air intake quantity QAFM can be avoided.

Moreover, the secondary air supply abnormality detection system for the internal combustion engine 10 of the embodiment has the crank angle sensor 27 as the engine rotation speed sensing means for sensing the engine rotation speed NE of the engine 10. The intake quantity restricting means provided by the CPU 41 of the ECU 40 restricts the air intake quantity QAFM below the intake quantity upper limit guard value Qup based on the engine rotation speed NE.

More specifically, in normal control of the air-fuel ratio, the suitable air intake quantity QFAM is set in accordance with the engine rotation speed NE, and the air intake quantity QFAM increases as the engine rotation speed NE increases. Therefore, the air intake quantity QAFM at the time when the secondary air supply system 30 is in the abnormal state is restricted by the intake quantity upper limit guard value Qup based on the level of the engine rotation speed NE. Thus, when the secondary air supply system 30 is in the abnormal state, the vehicle can travel to a safe place while preventing the excessive temperature increase of the three-way catalyst 23 caused by the excessive intake air beyond the limit temperature, above which the thermal degradation of the catalyst 23 will be caused.

Modification

Next, a modified example of the processing steps performed by the CPU 41 of the ECU 40 of the secondary air supply abnormality detection system of the internal combustion engine 10 of the third embodiment for setting another upper limit guard value will be explained based on a flowchart shown in FIG. 8, referring to FIG. 9. The processing for setting the upper limit guard value is performed when the secondary air supply abnormality detection system determines that the secondary air supply system 30 is in the abnormal state. FIG. 9 is a map used in the steps of the flowchart shown in FIG. 8 for setting the upper limit guard value TAup (°) of the throttle opening degree TA, based on the engine rotation speed NE (rpm). As shown in FIG. 9, the upper limit guard value TAup of the throttle opening degree TA is set to be smaller as the engine rotation speed NE increases. The CPU 41 repeatedly performs this upper limit guard value setting routine at a predetermined time interval.

Figure 8:
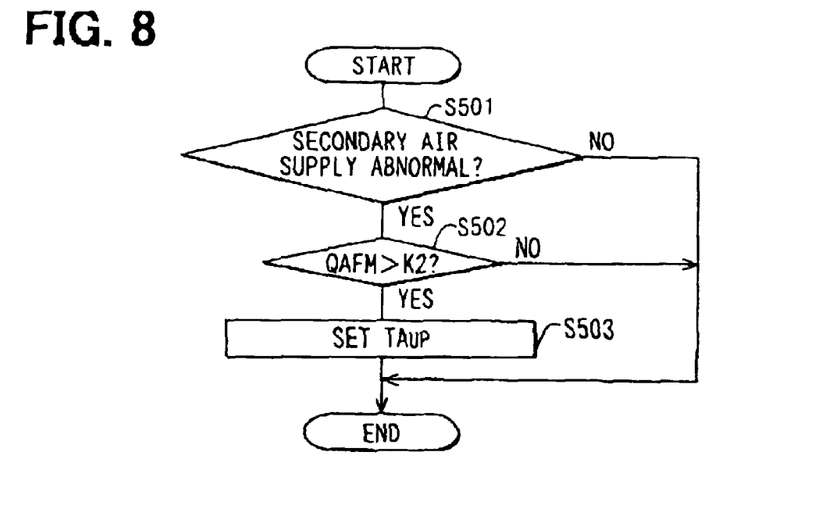
FIG. 8 is a flowchart showing a modified example of the processing steps of secondary air supply abnormality determination performed by the electronic control unit of the secondary air supply abnormality detection system according to the third embodiment.
Figure 9:
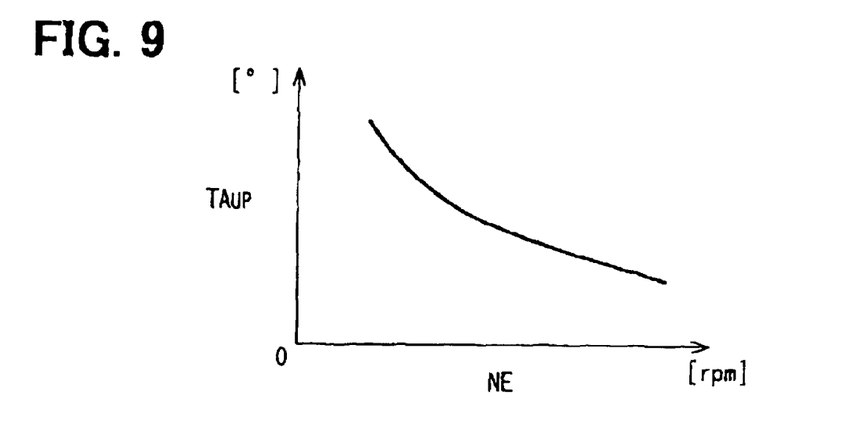
FIG. 9 is a map for setting an upper limit guard value of a throttle opening degree according to the third embodiment.

First, in Step S501 in FIG. 8, it is determined whether the secondary air supply, or the secondary air supply system 30, is in the abnormal state. If the result of the determination in Step S501 is "YES", the processing proceeds to Step S502 and it is determined whether the air intake quantity QAFM sensed by the airflow meter 12 is greater than a predetermined air intake quantity K2 or not. If the result of the determination in Step S502 is "YES", the processing proceeds to Step S503 and the upper limit guard value TAup of the throttle opening degree TA sensed by the throttle opening degree sensor 14 is set in accordance with the engine rotation speed NE as the parameter, based on the map shown in FIG. 9. Then, the routine is ended.

On the other hand, if the result of the determination in Step S501 is "NO" or if the result of the determination in Step S502 is "NO", the routine is ended without performing anything.

The secondary air supply abnormality detection system of the internal combustion engine 10 of the modified example has the crank angle sensor 27 as the engine rotation speed sensing means for sensing the engine rotation speed NE of the engine 10. The secondary air supply abnormality detection system has the throttle opening degree sensor 14 as the throttle opening degree sensing means for sensing the throttle opening degree TA of the throttle valve 13, which regulates the air intake quantity QAFM of the air introduced into the engine 10. The intake quantity restricting means provided by the CPU 41 of the ECU 40 restricts the throttle opening degree TA below the throttle opening degree upper limit guard value TAup, based on the engine rotation speed NE.

More specifically, when the stop of the secondary air supply is ordered, the abnormality in the secondary air flow rate from the secondary air supply system 30 is determined based on the secondary air downstream air-fuel ratio λAFS sensed by the air-fuel ratio sensor 24 and the engine supply air-fuel ratio λENG, which is estimated based on the air intake quantity QAFM and the fuel injection quantity F as the operating parameters at that time. The determination of the abnormality is performed when a predetermined period passes after the stop of the secondary air supply is ordered and the secondary air downstream air-fuel ratio λAFS becomes steady. More specifically, the abnormality in the secondary air supply system 30 can be determined because the secondary air downstream air-fuel ratio λAFS should coincide with the engine supply air-fuel ratio λENG when the secondary air supply from the secondary air supply system 30 is in the dormant state. If the secondary air supply system 30 is determined to be in the abnormal state, the air intake quantity QAFM to the engine 10 is restricted.

The air intake quantity QAFM is set by the throttle opening degree TA of the throttle valve 13. The throttle opening degree TA increases as the engine rotation speed NE increases. Therefore, the throttle opening degree TA at the time when the secondary air supply system 30 is in the abnormal state is restricted by the throttle opening degree upper limit guard value TAup corresponding to the level of the engine rotation speed NE. Thus, when the secondary air supply system 30 is in the abnormal state, the vehicle can travel to a safe place while preventing the excessive temperature increase of the three-way catalyst 23 beyond the limit temperature, which is caused when the throttle opening degree TA is excessively large.

In the above embodiments, in the secondary air supply system 30, the back pressure of the open-close valve 35 is switched between the atmospheric pressure and the intake pressure on the intake passage 11 side with the use of the combination valve 34 and the switching valve 38 disposed in the intake pressure introduction passage 37. Instead, an electromagnetic valve may be disposed in the secondary air supply passage 31 and may be opened or closed in accordance with the on/off operation of the air pump 33, without using the intake pressure on the intake passage 11 side.

The present invention should not be limited to the disclosed embodiments, but may be implemented in many other ways without departing from the spirit of the invention.

What is claimed is:

1. A secondary air supply abnormality detection system for an engine system including an internal combustion engine, a catalyst disposed in an exhaust passage of the engine for cleaning exhaust gas, and a secondary air supply system for supplying secondary air into the exhaust passage upstream of the catalyst, the secondary air supply abnormality detection system comprising:

air-fuel ratio sensing means disposed in the exhaust passage upstream of the catalyst and downstream of a secondary air supply opening for sensing an air-fuel ratio of the exhaust gas;

air-fuel ratio estimating means for estimating an air-fuel ratio of air-fuel mixture supplied to the engine;

secondary air flow rate calculating means for calculating a flow rate of the secondary air supplied from the secondary air supply system based on the air-fuel ratio of the air-fuel mixture supplied to the engine, which is estimated by the air-fuel ratio estimating means, and the air-fuel ratio, which is sensed by the air-fuel ratio sensing means when the secondary air is supplied from the secondary air supply system; and abnormality determining means for determining an abnormality in the engine system including the secondary air supply system based on the secondary air flow rate calculated by the secondary air flow rate calculating means.

2. The secondary air supply abnormality detection system as in claim 1, wherein the abnormality determining means determines the abnormality in the engine system including the secondary air supply system based on an averaged value or an integrated value of the flow rate of the secondary air in a predetermined period.

3. The secondary air supply abnormality detection system as in claim 1, wherein the abnormality determining means calculates a calculation error in the air-fuel ratio of the air-fuel mixture supplied to the engine based on the air-fuel ratio of the air-fuel mixture supplied to the engine and the air-fuel ratio, which is sensed by the air-fuel ratio sensing means when the secondary air is not supplied from the secondary air supply system, thereby the abnormality determining means corrects the secondary air flow rate calculated by the secondary air flow rate calculating means.

4. The secondary air supply abnormality detection system as in claim 1, further comprising:

air intake quantity sensing means for sensing quantity of intake air taken into an air intake passage of the engine; and fuel injection quantity calculating means for calculating quantity of fuel injected into the engine based on various operating parameters, wherein the air-fuel ratio of the air-fuel mixture supplied to the engine is calculated from the air intake quantity and the fuel injection quantity.

5. The secondary air supply abnormality detection system as in claim 1, wherein the secondary air supply abnormality detection system stops the secondary air supply and feedback-control of the air-fuel ratio when the abnormality determining means determines that the abnormality is generated in the engine system including the secondary air supply system.

6. The secondary air supply abnormality detection system as in claim 1, wherein the secondary air supply abnormality detection system prohibits diagnosis of the abnormality in the engine system including the secondary air supply system under a condition that an error in the calculation of the air-fuel ratio of the air-fuel mixture supplied to the engine is increased, a condition that the flow rate of the secondary air is unsteady, or a condition that an air intake quantity is large and a ratio of the secondary air flow rate is small.

7. A secondary air supply abnormality detection system for an engine system including an internal combustion engine, a catalyst disposed in an exhaust passage of the engine for cleaning exhaust gas, and a secondary air supply system for supplying secondary air into the exhaust passage upstream of the catalyst, the secondary air supply abnormality detection system comprising:

air-fuel ratio sensing means disposed in the exhaust passage upstream of the catalyst and downstream of a secondary air supply opening for sensing an air-fuel ratio of the exhaust gas; and abnormality determining means for determining that an abnormality is generated in the engine system including the secondary air supply system if an air-fuel ratio deviation between the air-fuel ratio of the air-fuel mixture supplied to the engine and the air-fuel ratio, which is sensed by the air-fuel ratio sensing means when the secondary air is supplied from the secondary air supply system, is out of a predetermined range.

8. The secondary air supply abnormality detection system as in claim 7, wherein the abnormality determining means determines the abnormality in the engine system including the secondary air supply system based on an averaged value or an integrated value of the air-fuel ratio deviation in a predetermined period.

9. The secondary air supply abnormality detection system as in claim 7, wherein the abnormality determining means corrects a calculation error in the air-fuel ratio deviation based on the air-fuel ratio deviation between the air-fuel ratio of the air-fuel mixture supplied to the engine and the air-fuel ratio, which is sensed by the air-fuel ratio sensing means when the secondary air is not supplied from the secondary air supply system.

10. The secondary air supply abnormality detection system as in claim 7, further comprising:

air intake quantity sensing means for sensing quantity of intake air taken into an air intake passage of the engine; and fuel injection quantity calculating means for calculating quantity of fuel injected into the engine based on various operating parameters, wherein the air-fuel ratio of the air-fuel mixture supplied to the engine is calculated from the air intake quantity and the fuel injection quantity.

11. The secondary air supply abnormality detection system as in claim 7, wherein the secondary air supply abnormality detection system stops the secondary air supply and feedback-control of the air-fuel ratio when the abnormality determining means determines that the abnormality is generated in the engine system including the secondary air supply system.

12. The secondary air supply abnormality detection system as in claim 7, wherein the secondary air supply abnormality detection system prohibits diagnosis of the abnormality in the engine system including the secondary air supply system under a condition that an error in the calculation of the air-fuel ratio of the air-fuel mixture supplied to the engine is increased, a condition that the flow rate of the secondary air is unsteady, or a condition that an air intake quantity is large and a ratio of the secondary air flow rate is small.

13. A secondary air supply abnormality detection system for an engine system including an internal combustion engine, a catalyst disposed in an exhaust passage of the engine for cleaning exhaust gas, a secondary air supply system for supplying secondary air into the exhaust passage upstream of the catalyst, the secondary air supply abnormality detection system comprising:

abnormality determining means for determining an abnormality in a flow rate of the secondary air supplied from the secondary air supply system when the secondary air supply system is ordered to stop the secondary air supply; and air intake quantity restricting means for restricting quantity of intake air taken into the engine when the abnormality determining means determines that the abnormality is generated in the secondary air supply from the secondary air supply system.

14. The secondary air supply abnormality detection system as in claim 13, wherein the abnormality determining means determines the abnormality in the flow rate of the secondary air supplied from the secondary air supply system when a predetermined period passes after the secondary air supply system is ordered to stop the secondary air supply.

15. The secondary air supply abnormality detection system as in claim 13, further comprising:

engine rotation speed sensing means for sensing engine rotation speed of the engine, wherein the air intake quantity restricting means restricts the air intake quantity based on the engine rotation speed.

16. The secondary air supply abnormality detection system as in claim 13, further comprising:

engine rotation speed sensing means for sensing engine rotation speed of the engine; and throttle opening degree sensing means for sensing an opening degree of a throttle valve, which is disposed in order to regulate the quantity of the intake air taken into the engine, wherein the air intake quantity restricting means restricts the opening degree of the throttle valve based on the engine rotation speed.

* * * * *